(12) United States Patent
Sandoval et al.

(10) Patent No.: US 8,022,004 B2
(45) Date of Patent: Sep. 20, 2011

(54) MULTI-COATED ELECTRODE AND METHOD OF MAKING

(75) Inventors: Scot P Sandoval, Morenci, AZ (US); Michael D Waite, Strongsville, OH (US); Masatsugu Morimitsu, Kyoto (JP); Casey J Clayton, Morenci, AZ (US)

(73) Assignee: Freeport-McMoran Corporation, Pheonix, AZ (US)

( * ) Notice: Subject to any disclaimer, the term of this patent is extended or adjusted under 35 U.S.C. 154(b) by 253 days.

(21) Appl. No.: 12/432,454

(22) Filed: Apr. 29, 2009

(65) Prior Publication Data
US 2009/0288856 A1 Nov. 26, 2009

(51) Int. Cl.
*H01M 4/88* (2006.01)
*H01M 4/90* (2006.01)
*H01M 4/92* (2006.01)

(52) U.S. Cl. ........... 502/101; 204/206.1; 204/290.01; 204/290.14; 204/290.12; 204/290.13

(58) Field of Classification Search ............ 204/284, 204/286.1, 290.01, 290.14, 290.12, 290.03, 204/290.08, 290.09, 290.1, 290.13, 291; 502/101

See application file for complete search history.

(56) References Cited

U.S. PATENT DOCUMENTS

| | | | |
|---|---|---|---|
| 3,869,312 A | 3/1975 | Moss | |
| 3,878,083 A | 4/1975 | De Nora | |
| 3,948,751 A | 4/1976 | Bianchi | |
| RE28,820 E | 5/1976 | Beer | |
| 4,003,817 A | 1/1977 | Bianchi | |
| 4,112,140 A | 9/1978 | Heikel | |
| 4,203,810 A | 5/1980 | Warne | |
| 4,214,971 A | 7/1980 | Heikel | |
| 4,223,049 A | 9/1980 | Murray | |
| 4,331,528 A | 5/1982 | Beer | |
| 4,384,939 A | 5/1983 | Kim | |
| 4,411,762 A | 10/1983 | Kline | |
| 4,460,450 A | 7/1984 | Koziol | |
| 4,481,097 A | 11/1984 | Asano | |
| 4,502,936 A | 3/1985 | Hayfield | |
| 4,517,068 A | 5/1985 | Hindeu | |
| 4,528,084 A | 7/1985 | Beer | |
| 4,585,540 A | 4/1986 | Beer | |
| 4,642,173 A | 2/1987 | Koziol | |
| 4,696,731 A | 9/1987 | Tenhover | |
| 4,708,888 A | 11/1987 | Mitchell | |
| 4,797,182 A | 1/1989 | Beer | |
| 4,913,973 A | 4/1990 | Geusic | |
| 5,004,626 A | 4/1991 | Dong | |
| 5,031,290 A | 7/1991 | Brereton | |
| 5,098,546 A | 3/1992 | Kawashima | |
| 5,156,726 A | 10/1992 | Nakada | |
| 5,290,415 A | 3/1994 | Shimamune | |
| 5,294,317 A | 3/1994 | Saito | |
| 5,354,444 A | 10/1994 | Shimamune | |
| 5,451,307 A | 9/1995 | Bennett | |
| 5,503,663 A | 4/1996 | Tsou | |
| 5,560,815 A | 10/1996 | Sekimoto | |
| 5,672,394 A * | 9/1997 | Hardee et al. | 204/290.13 |
| 6,103,093 A | 8/2000 | Nidola | |
| 6,103,299 A | 8/2000 | Shimamune | |
| 6,165,331 A | 12/2000 | Hughes | |
| 6,210,550 B1 | 4/2001 | Nidola | |
| 6,217,729 B1 | 4/2001 | Zolotarsky | |
| 6,231,731 B1 * | 5/2001 | Kondo et al. | 204/290.03 |
| 6,527,939 B1 | 3/2003 | Hardee | |
| 6,936,155 B1 | 8/2005 | Morimitsu | |
| 7,247,229 B2 | 7/2007 | Hardee | |
| 7,258,778 B2 | 8/2007 | Hardee | |
| 2009/0288958 A1 * | 11/2009 | Sandoval et al. | 205/576 |

FOREIGN PATENT DOCUMENTS

| | | |
|---|---|---|
| JP | 4099294 A2 | 3/1992 |
| JP | 10287998 A2 | 10/1998 |
| JP | 2002158013 | 5/2002 |
| JP | 2002275697 | 9/2002 |
| JP | 2004238697 | 8/2004 |
| JP | 2007-146215 | 6/2007 |
| JP | 2007146215 * | 6/2007 |
| JP | 2009293117 | 12/2009 |
| JP | 2010001556 | 1/2010 |

OTHER PUBLICATIONS

"Stability of Iridium Oxide-Tantalum Oxide Coated Titanium Electrodes for Oxygen Evolution in Alkaline Solutions,"; M. Morimitsu, C. Murakami, K. Kawaguchi, R. Otogawa, and M. Matsunaga; <http:www.polymtl.ca/newmaterials/eng/journal/ejournal/oct2004/art10.pdf>.

Titanium Anodes with Active Coatings Based on Iridium Oxides: The Chemical Composition of the Coatings and the Distribution of Their Components over Depth on Anodes Made of $IrO_2$, $IrO_2 + TiO_2$, $IrO_2 + RuO_2 + TiO_2$, and $IrO_2 + RuO_2 + TiO_2 + Ta_2O_5$; vol. 39; Publication date: Oct. 2003; <http://www.springerlink.com/content/h2466442v8770747/>.

The International Search Report and Written Opinion from corresponding PCT Application No. PCT/US09/044341 dated Aug. 28, 2009.

\* cited by examiner

*Primary Examiner* — Bruce Bell (74) *Attorney, Agent, or Firm* — Snell & Wilmer L.L.P.

(57) ABSTRACT

Various embodiments provide an electrode comprising a conductive substrate, a first layer of a mixture comprising iridium oxide in a crystalline phase and tantalum oxide in an amorphous phase on a portion of an outer surface of the conductive substrate, and a second layer of the mixture comprising iridium oxide in an amorphous phase and tantalum oxide in an amorphous phase on an outer surface of the first layer.

6 Claims, 9 Drawing Sheets

MULTI-COATED ELECTRODE AND METHOD OF MAKING

FIELD OF THE INVENTION

The present invention relates generally to electrodes that may be employed in electrolytic cells, and relates more specifically to anodes that may be employed in electrowinning of a metal value.

BACKGROUND

Electrowinning is a well-known process for refining a desired metal value. Typically, electrowinning is accomplished in an electrolytic cell containing the desired metal ion in a solution. A cathode and an anode are immersed in the solution. When a current is passed through the electrolytic cell, the desired metal value is plated onto the cathode. The commercial use of electrowinning requires a large number of cathodes and anodes in a single electrolytic cell. Anodes employed in conventional electrowinning operations typically comprise lead or a lead alloy, such as, for example, Pb—Sn—Ca. One significant disadvantage of using such anodes is that during the electrowinning operation small amounts of lead are released from the surface of the anode, and may ultimately cause the generation of undesirable sediments or sludge, particulates suspended in the electrolyte, other corrosion products, or other physical degradation products in the electrochemical cell and/or cause the contamination of the desired metal value.

In addition, in certain copper electrowinning operations, unwanted side reactions on the anode such as deposition and/or accumulation of manganese compounds, such as for example, $MnO_2$ and MnOOH, on the anode may deleteriously impact the copper electrowinning operation.

Attempts to coat an anode to limit the release of undesirable sediments and other physical degradation products or to limit contamination of the desired metal value have been made, but such attempts have yielded an electrolytic cell which demands more power to operate and/or is otherwise undesirable. Exemplary of one prior art coating can be found in U.S. Pat. No. 7,247,229. Improvements are needed for anode coatings, for anodes themselves, and for the electrolytic cell in which anodes are used.

SUMMARY

Accordingly, in various embodiments, the present invention provides an electrode comprising a conductive substrate and an amorphous $IrO_2$ containing layer on an outer surface of the conductive substrate. In various embodiments, the present invention provides an electrode comprising a conductive substrate, a crystalline $IrO_2$ containing layer formed on the conductive substrate, and an amorphous $IrO_2$ containing layer formed on the crystalline $IrO_2$ containing layer. The crystalline or amorphous $IrO_2$ containing layers may comprise a mixture of $IrO_2$ and $Ta_2O_5$. In the mixture, the mole ratio of Ir:Ta may be about 4:1.

Moreover, in various embodiments, the present invention provides methods of making an electrode for electrowinning. The methods may include preparing of a precursor solution containing iridium and tantalum. Iridium and tantalum in the precursor solution may be in the forms of ions, complex ions, inorganic compounds, or organic compounds, but not metal oxides. The method may include coating of a conductive substrate with the precursor solution and heating of the precursor solution at a temperature below the glass transition temperature of $IrO_2$ to produce an amorphous $IrO_2$ containing layer on the conductive substrate. The temperature below the glass transition temperature may be 340° C.-430° C.

In various embodiments of the methods, the method may include coating a conductive substrate with the precursor solution and heating of the precursor solution at a temperature above the glass transition temperature of $IrO_2$ to produce a crystalline $IrO_2$ containing layer on the conductive substrate. The temperature above the glass transition temperature may be 450° C.-550° C. The method may also include coating the crystalline $IrO_2$ containing layer with the precursor solution and heating of the precursor solution at a temperature below the glass transition temperature of $IrO_2$ to produce an amorphous $IrO_2$ containing layer.

In various embodiments, the method may contain repeating of the coating and the heating to produce the amorphous $IrO_2$ containing layer or the crystalline $IrO_2$ containing layer until obtaining a certain amount. One process of the coating and heating may produce the amorphous $IrO_2$ containing layer or the crystalline $IrO_2$ containing layer, each of which consists of one coat. Repeating the process may produce the amorphous $IrO_2$ containing layer or the crystalline $IrO_2$ containing layer, each of which consists of multiple coats and is a larger amount than one coat.

Further areas of applicability will become apparent from the description provided herein. It should be understood that the description and specific examples are intended for purposes of illustration only and are not intended to limit the scope of the present invention.

BRIEF DESCRIPTION OF THE DRAWINGS

The drawings described herein are for illustration purposes only and are not intended to limit the scope of the present disclosure in any way. The present invention will become more fully understood from the detailed description and the accompanying drawings wherein.

DETAILED DESCRIPTION

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Various embodiments of the present invention are an improvement to a conventional electrode for an electrolytic cell. In various embodiments, the electrode is an anode. The present invention may provide an improvement in the efficiency of the current flow of an electrolytic cell. In various embodiments, an anode of the present invention may decrease power requirements of an electrolytic cell. In various embodiments, the present invention greatly improves the economics of electrowinning a metal value. Various embodiments of the present invention impede the generation of undesirable sediments, sludge, particulates suspended in the electrolyte, other corrosion products, or other physical degradation products in the electrolytic cell, which may cause contamination of a desired metal value.

In various embodiments, the present invention provides an electrode which may be used as an anode in a copper electrowinning operation. In various embodiments, the electrode may reduce an anode potential and may suppress unwanted side reactions on the anode, such as deposition and accumulation of manganese compounds, such as for example, $MnO_2$ and MnOOH on the anode in copper electrowinning operations. The suppression of unwanted side reactions may decrease cell voltage and save in electrical energy consumption in operation of an electrolytic cell. In various embodiments, the electrode may reduce the production cost of electrowon metal values, such as copper. The suppression of unwanted side reactions, mainly those of deposition of and/or of accumulation of manganese compounds onto the anode, may increase the operational lifetime of the anode.

In various embodiments, the present invention provides an electrode comprising a conductive substrate, a first layer comprising a compound in crystalline phase on an outer surface of the conductive substrate, and a second layer comprising the compound having at least portion thereof in an amorphous phase on the first layer. In an aspect of the invention, the compound can be in a precursor solution, which may be a mixture of the compound and additional materials, solvents, and/or other compounds. The precursor solution can be coated over at least a portion of the conductive substrate and then heated to a temperature above the glass transition temperature of the compound to create a first layer. The precursor solution can be coated over the first layer and then heated to a temperature below the glass transition temperature of the compound to create a second layer.

In various embodiments, the compound can be $IrO_2$. Although the compound is $IrO_2$ as further described in the description and examples herein, those skilled in the art will appreciate that the invention can be practiced using any compound or mixture which has a glass transition temperature and/or can be in either a crystalline or an amorphous phase.

Various embodiments provide an electrode comprising a conductive substrate, a first layer of a mixture comprising iridium oxide in a crystalline phase and tantalum oxide in an amorphous phase on at least a portion of an outer surface of the conductive substrate, and a second layer of the mixture comprising iridium oxide in an amorphous phase and tantalum oxide in an amorphous phase on at least a portion of an outer surface of the first layer.

In various embodiments, an electrode comprises an amorphous iridium oxide ("$IrO_2$") containing layer. In various embodiments, an electrode comprises a conductive substrate, a crystalline $IrO_2$ containing layer formed over the conductive substrate, and an amorphous $IrO_2$ containing layer formed over the crystalline $IrO_2$ containing layer. In various embodiments, an electrode comprises a conductive substrate and an amorphous $IrO_2$ containing layer formed over the conductive substrate.

In various embodiments, the present invention provides an electrode that may reduce the anode potential by catalyzing oxygen evolution. In addition, the utilization of the electrodes may improve the quality and purity of the metal value on the cathode.

In various embodiments, the present invention provides an electrode comprising a conductive substrate, a crystalline $IrO_2$ containing layer on an outer surface of the conductive substrate, and an amorphous $IrO_2$ containing layer on an outer surface of the crystalline $IrO_2$ containing layer. In an aspect of the present invention, the crystalline $IrO_2$ containing layer and the amorphous $IrO_2$ containing layer may contain a mixture of the $IrO_2$ and tantalum oxide such as $Ta_2O_5$.

Figure 1:
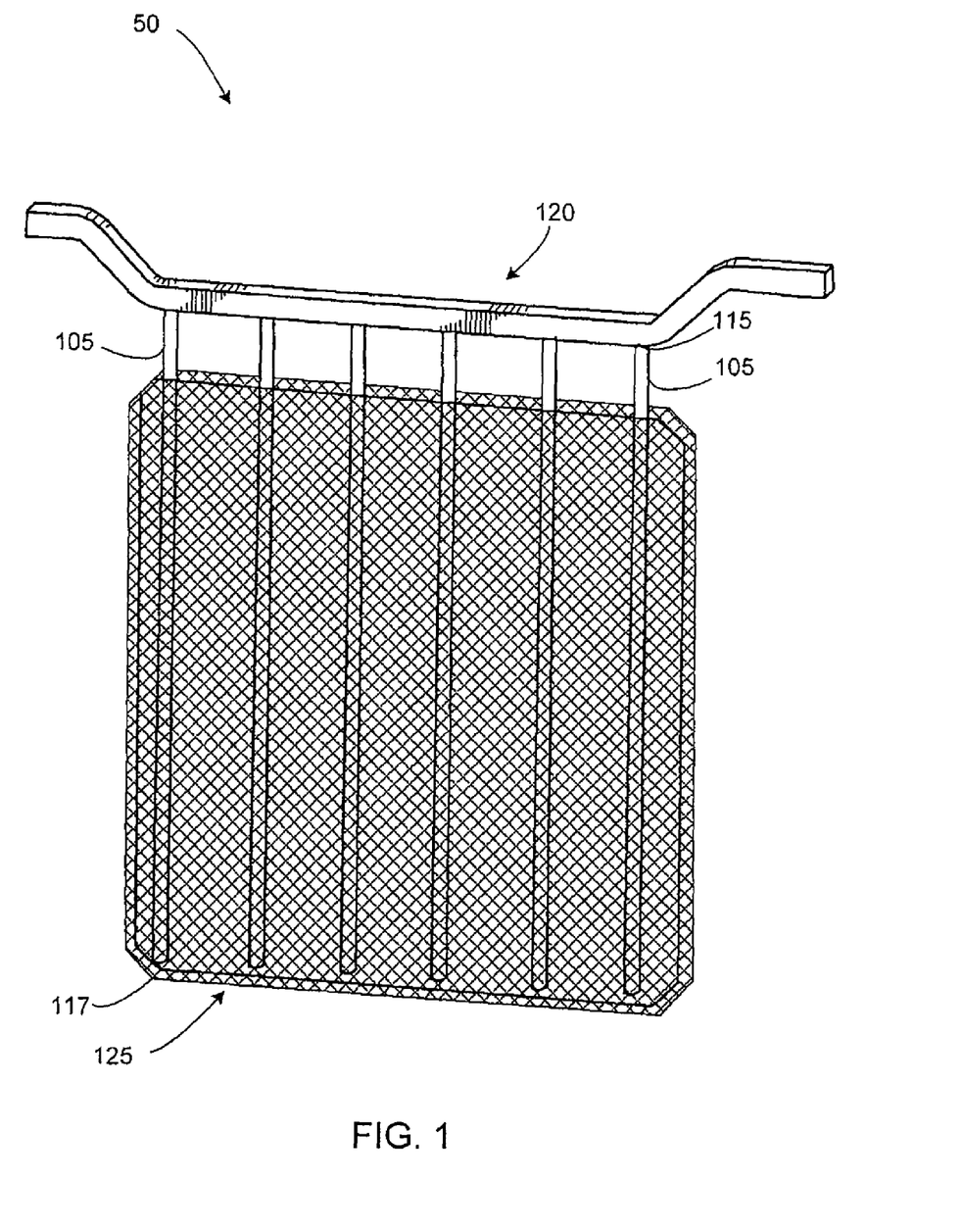
FIG. 1 is a partial perspective view illustrating an electrode comprising a screen according to various embodiments of the present invention.
Figure 2:
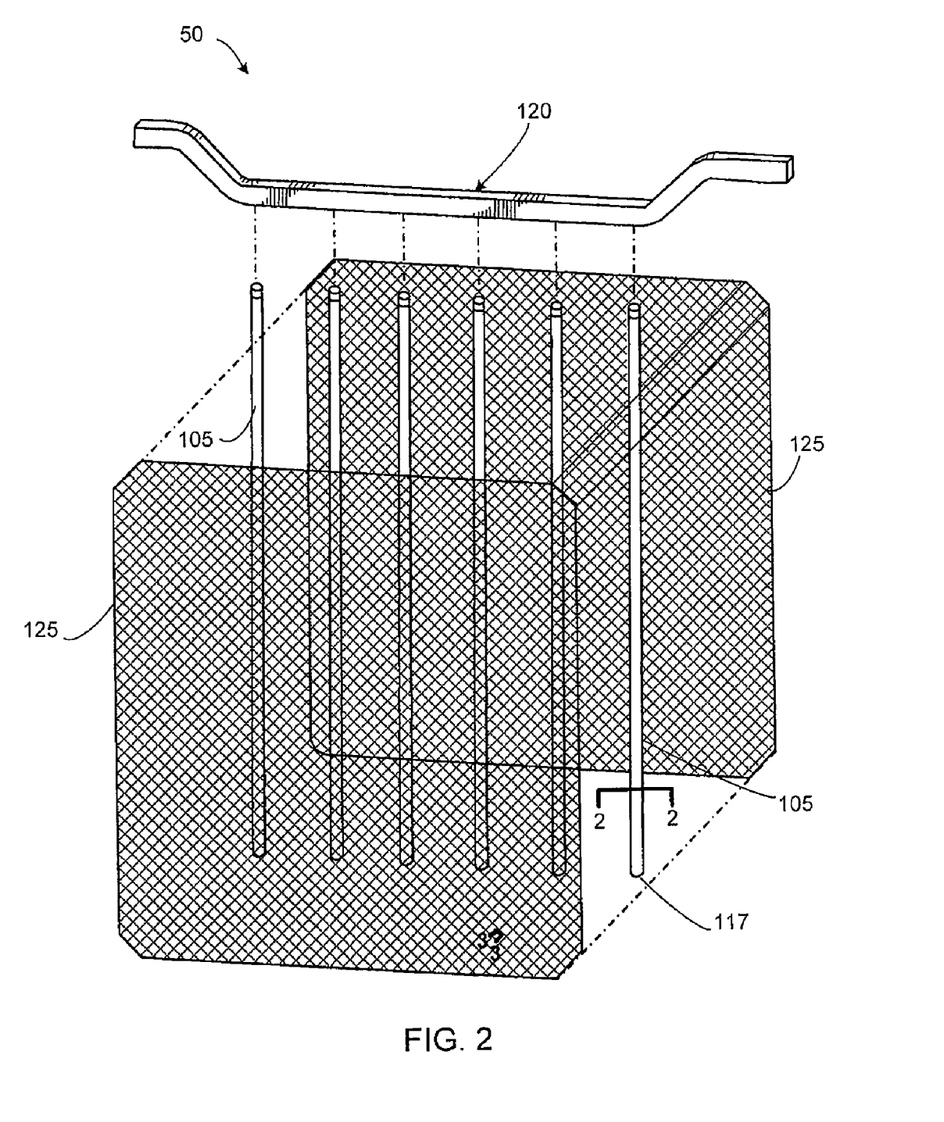
FIG. 2 is a fragmented perspective view illustrating the electrode of FIG. 1 according to various embodiments of the present invention.

With reference to FIGS. 1 and 2, an electrode is illustrated according to various embodiments of the present invention. In various embodiments, the electrode is an anode 50 for use in an electrolytic cell. Anode 50 comprises an electrically conductive material. Anode 50 is coupleable or connectable to a power source of an electrolytic cell. Anode 50 comprises hanger bar 120 and plurality of conductive rods 105 connected to hanger bar 120 at joint 115.

As illustrated in FIGS. 1 and 2, hanger bar 120 is configured to be positioned horizontally in an electrowinning cell. In various embodiments, hanger bar 120 may have other shapes and/or configurations such as, for example, but not limited to, substantially straight, steer horn configurations, multi-angled configurations, offset configurations, combinations thereof, and the like. In various embodiments, hanger bar 120 comprises a conductive material, for example, but not limited to, copper, copper alloy, aluminum, copper aluminum alloys, stainless steel, titanium, gold, combinations thereof, or any other electrically conductive material suitable for hanger bar 120.

Typically, rods 105 are approximately the same length, diameter, and material of construction and may be spaced approximately evenly along the length of the hanger bar 120. Rods 105 may have any suitable cross-sectional geometry, such as, for example, round, hexagonal, square, rectangular, octagonal, oval, elliptical, rhombus, corrugated, or any other desired geometry. The desired cross-sectional geometry of rods 105 may be chosen to optimize harvestability of a metal value and/or to optimize flow and/or mass transfer characteristics of the electrolyte within the electrolytic cell. Rods 105 may be oriented in any direction, for example angled such that a direction of flow is changed as electrolyte goes through the plurality of rods. For example, rods 105 may have a cross-sectional geometry of a square and a face of the square is offset from the front of anode 50 at an angle such that the flow of the electrolyte is diverted. Those skilled in the art will appreciate that any suitable cross-sectional geometry and any orientation of the rods 105 may be used to optimize flow and/or increase yield or harvestability of metal value that is being electrowon.

In various embodiments, rods 105 may be formed of a conductive material such as, for example, copper, copper alloy, aluminum, copper aluminum alloys, stainless steel, titanium, gold, combinations thereof, or any other electrically conductive material suitable for rods 105. In various embodiments, rods 105 may comprise a, combination of conductive materials in which an outer surface of a first conductive material is coated or clad by a second conductive material. In an exemplary embodiment, rods 105 comprise a copper or copper alloy core and a titanium cladding clad over the core.

As illustrated in FIGS. 1 and 2, rods 105 are preferably connected at joint 115 to hanger bar 120. Joint 115 may be any known or hereafter developed fastening system that provides conductivity from hanger bar 120 to rods 105 and the strength to hold rods 105 to hanger bar 120. For example, joint 115 may consist of welding rods 105 to hanger bar 120 and such techniques are well known to those skilled in the art. In various embodiments, joint 115 may include holes drilled into hanger bar 120 so that plurality of rods 105 may be connected to hanger bar 120 by using a press fit system. In various embodiments, joint 115 may include the use of a conductive adhesive, such as, for example, but not limited to, polyacrylomide compositions. In various embodiments, joint 115 may have low resistance and provide high conductivity from hanger bar 120 to rods 105. In various embodiments, joint 115 can be designed to be corrosion resistant or at least substantially corrosion resistant.

Figure 3:
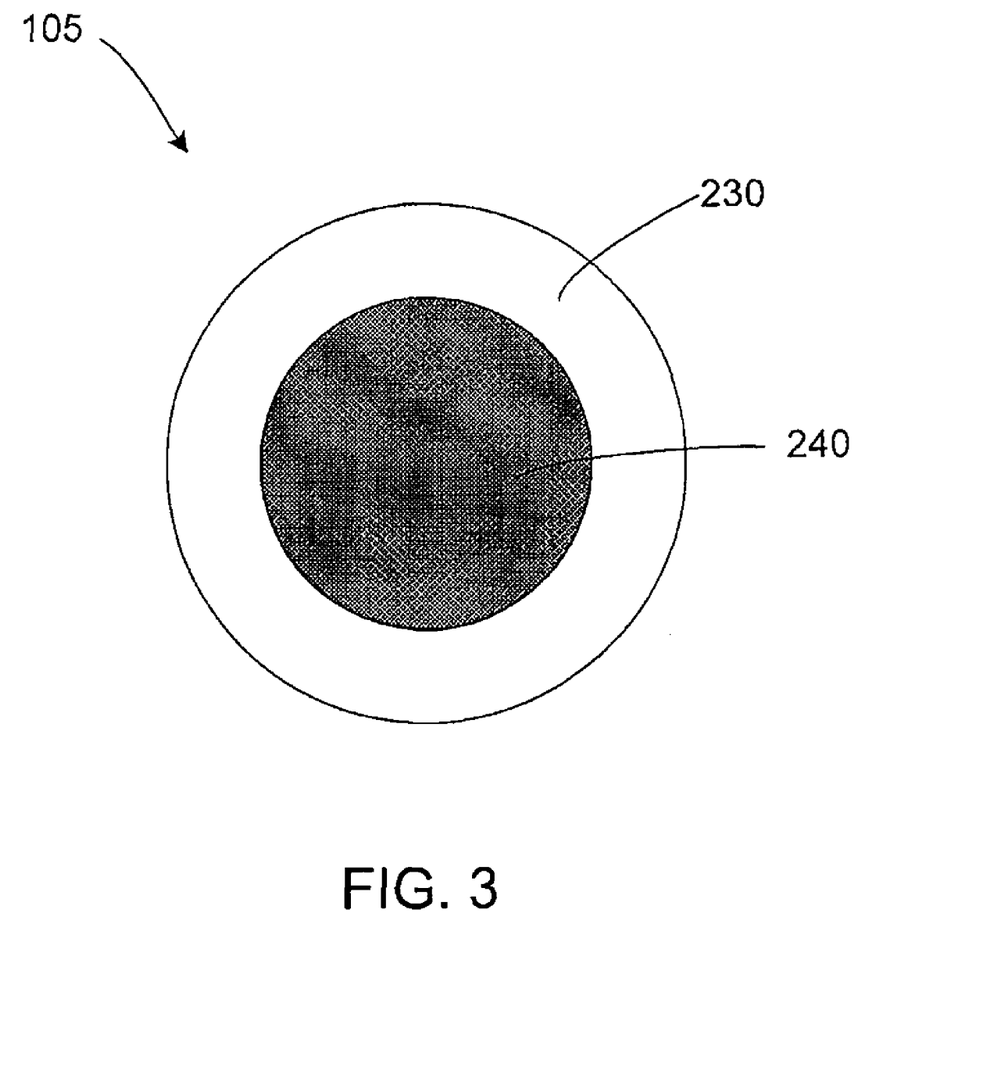
FIG. 3 is a cross sectional view of the electrode along the line 2-2 of FIG. 2 according to various embodiments of the present invention.

With reference to FIG. 3, a cross sectional view of one of the rods 105 along the line 2-2 of FIG. 2 is illustrated. Conductive substrate 240 may be made of any metal, alloy, or material that is electrically conductive and is substantially rigid. As used herein, "substantially rigid" means an essentially rigid substrate that has some bend or flex to its structure. For example, thin wires, which are substantially rigid but are still bendable and constructed using a conductive metal or alloy, may be appropriate for use for as conductive substrate 240. Conductive substrate 240 may comprise any electrically conductive metal, alloy, polymer, and/or material, such as, for example, but not limited to, copper, copper alloys, aluminum, copper aluminum alloys, stainless steel, titanium, palladium, platinum, gold, valve metals or any other metal alloy, conductive polymer, or conductive material and combinations thereof. In an exemplary embodiment, a copper rod may be used for conductive substrate 240.

In various embodiments, as illustrated in FIG. 3, conductive substrate 240 may be clad with a layer of conductive cladding layer 230. The conductive cladding layer 230 may be any conductive material, metal, alloy, conductive polymer, or other electrically conductive material. Cladding may be desirable for a number of reasons, including, for example but not limited to, providing corrosion resistance, and/or increasing operational life time of anode 50.

In various embodiments, conductive cladding layer 230 may comprise a valve metal. In various embodiments of the present invention, conductive cladding layer 230 may be formed of one of the so-called "valve" metals, including titanium, tantalum, zirconium, or niobium. For example, titanium may be alloyed with nickel, cobalt, iron, manganese, or copper to form a suitable conductive cladding layer 230. In an exemplary embodiment, conductive cladding layer 230 comprises titanium, because, among other things, titanium is rugged and corrosion-resistant.

Conductive cladding layer 230 may cover essentially the entire surface of conductive substrate 240 and in various embodiments may include a cap for distal end 117 of at least one of rods 105. In various embodiments, conductive cladding layer 230 goes to distal end 117. In various embodiments, conductive cladding layer 230 covers the entirety of the surface of rods 105 up to joint 115. Conductive cladding layer 230 may be a seal to joint 115 if joint 115 includes rods 105 press fit into hanger bar 120. Typically, conductive cladding layer 230 is not included on a portion of rods 105 that is inserted into holes of hanger bar 120 for press fit applications of joint 115.

With reference back to FIGS. 1 and 2, in accordance with various embodiments, screen 125 may be fastened to rods 105, and such fastening methods are well known in the art and may include, for example, welding, adhesives, braided wire, fasteners, staples, and the like. Any means now known or hereafter developed that may hold screen 125 to rods 105 may be used as long as a portion of screen 125 is in electrical conductive contact to at least one of rods 105. In various embodiments, screen 125 comprises a single screen-like sheet, and in other embodiments, screen 125 comprises a plurality of screen-like sheets. In various embodiments, screen 125 may be attached on a front surface of rods 105 and a second screen 125 may be attached to a back surface of rods 105.

Screen 125 may be constructed of any conductive material, for example, those as described herein. As illustrated in FIG. 4, screen 125 can comprise screen substrate 260. In various embodiments, screen substrate 260 comprises a valve metal or a combination of valve metals or alloys comprising at least one valve metal. In an exemplary embodiment, screen substrate 260 comprises titanium.

In various embodiments, screen 125 may comprise screen substrate 260 configured in the form of a sheet, a perforated sheet, or an expanded sheet. For example in constructing screen substrate 260, an expanded sheet may be made by putting slits through a metal sheet then pulling the metal sheet from all sides to create an expanded sheet having a plurality of substantially diamond shaped holes. In an exemplary embodiment, anode 50 comprises screen 125 having screen substrate 260 configured as an expanded sheet comprising titanium and screen 125 is welded to at least one of the rods 105.

In other embodiments, screen 125 may comprise screen substrate 260 configured in the form of a mesh-like substrate. In an exemplary embodiment, screen 125 comprises a woven wire screen with about a 100×100 strand per square inch to about a 10×10 strand per square inch, preferably from about an 80×80 strand per square inch to about a 30×30 strand per square inch, and more preferably about a 60×60 strand per square inch to about a 40×40 strand per square inch. However, other various rectangular and irregular geometric mesh configurations may be used. In various embodiments, screen 125 may be somewhat more porous, for example, a strand every square inch. Any strand pitch may be used for construction of screen 125. In various embodiments, screen 125 uses an irregular pattern in which there is not a consistent pitch from side to side.

With reference to FIG. 4, a cross section of screen 125 along the line 3-3 of FIG. 2 is illustrated according to various embodiments of the present invention. As illustrated in FIG. 4A, in various embodiments, screen 125 comprises a substantially flat screen substrate 260, crystalline $IrO_2$ containing layer 220, and amorphous $IrO_2$ containing layer 210. In various embodiments, crystalline $IrO_2$ containing layer 220 may comprise a mixture of crystalline $IrO_2$ and amorphous $Ta_2O_5$, and amorphous $IrO_2$ containing layer 210 may comprise a mixture of amorphous $IrO_2$ and amorphous $Ta_2O_5$ or a mixture of amorphous and crystalline $IrO_2$ and amorphous $Ta_2O_5$.

Figure 4A:
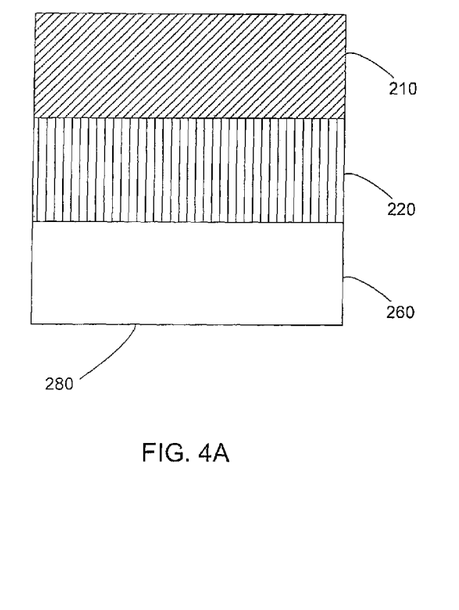
FIG. 4 is a cross sectional view of the screen along the line 3-3 of FIG. 2 according to various embodiments of the present invention.

Screen substrate 260 has a bottom surface 280. In an exemplary embodiment, a portion of bottom surface 280 is in electrical contact with at least one of the rods 105. In an exemplary embodiment, crystalline $IrO_2$ containing layer 220 and amorphous $IrO_2$ containing layer 210 are on a surface of screen substrate 260 that is distal to rods 105. In various embodiments, screen substrate 260 is any electrically conductive material that may be made into a sheet.

In various embodiments, crystalline $IrO_2$ containing layer 220 comprises a mixture of crystalline $IrO_2$ and amorphous $Ta_2O_5$. In various embodiments, amorphous $IrO_2$ containing layer 210 comprises a mixture of amorphous $IrO_2$ and amorphous $Ta_2O_5$, or may comprise a mixture of amorphous and crystalline $IrO_2$ and amorphous $Ta_2O_5$. In various embodiments, at least one of crystalline $IrO_2$ containing layer 220 and amorphous $IrO_2$ containing layer 210 comprises multiple coats of a mixture of $IrO_2$ and $Ta_2O_5$. For example, crystalline $IrO_2$ containing layer 220 or amorphous $IrO_2$ containing layer 210 can comprise from about 1 coat to about 100 coats or about 1 coat to about 50 coats or preferably about 1 coat to about 20 coats or more preferably about 1 coat to about 10 coats. In an exemplary embodiment, screen 125 comprises a crystalline $IrO_2$ containing layer 220 comprising about four coats of a mixture of crystalline $IrO_2$ and amorphous $Ta_2O_5$. In an exemplary embodiment, screen 125 comprises about seven coats of amorphous $IrO_2$ containing layer 210 comprising a mixture of amorphous $IrO_2$ and amorphous $Ta_2O_5$ or a mixture amorphous and crystalline $IrO_2$ and amorphous $Ta_2O_5$.

Figure 4B:
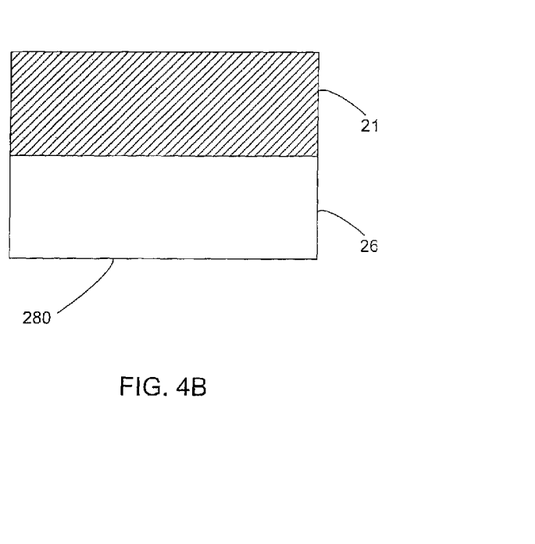

As illustrated in FIG. 4B, in various embodiments, screen 125 comprises an essentially flat screen substrate 260 and amorphous $IrO_2$ containing layer 210. In various embodiments, amorphous $IrO_2$ containing layer 210 comprises multiple coats of a mixture of amorphous $IrO_2$ and amorphous $Ta_2O_5$ or a mixture of amorphous and crystalline $IrO_2$ and amorphous $Ta_2O_5$. In an exemplary embodiment, amorphous $IrO_2$ containing layer 210 is on a surface of screen substrate 260 that is distal to rods 105.

Figure 4C:
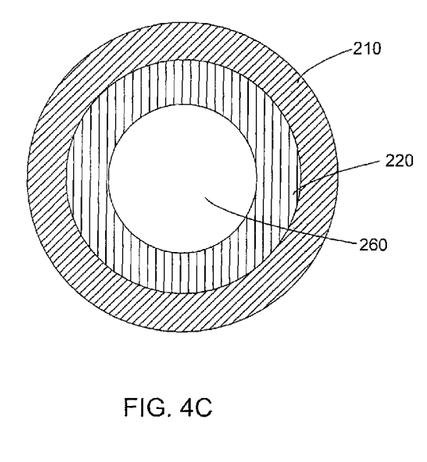

As illustrated in FIG. 4C, in various embodiments, screen 125 comprises screen substrate 260, crystalline $IrO_2$ containing layer 220, and amorphous $IrO_2$ containing layer 210. In various embodiments, crystalline $IrO_2$ containing layer 220 can comprise a mixture of crystalline $IrO_2$ and amorphous $Ta_2O_5$, and amorphous $IrO_2$ containing layer 210 can comprise a mixture of amorphous $IrO_2$ and amorphous $Ta_2O_5$ or a mixture of amorphous and crystalline $IrO_2$ and amorphous $Ta_2O_5$. In various embodiments, crystalline $IrO_2$ containing layer 220 comprises multiple coats of a mixture of crystalline $IrO_2$ and amorphous $Ta_2O_5$. In various embodiments, amorphous $IrO_2$ containing layer 210 comprises multiple coats of a mixture of amorphous $IrO_2$ and amorphous $Ta_2O_5$ or a mixture of amorphous and crystalline $IrO_2$ and amorphous $Ta_2O_5$. In various embodiments, at least one of crystalline $IrO_2$ containing layer 220 and amorphous $IrO_2$ containing layer 210 comprises multiple coats of a mixture of $IrO_2$ and $Ta_2O_5$.

Figure 4D:
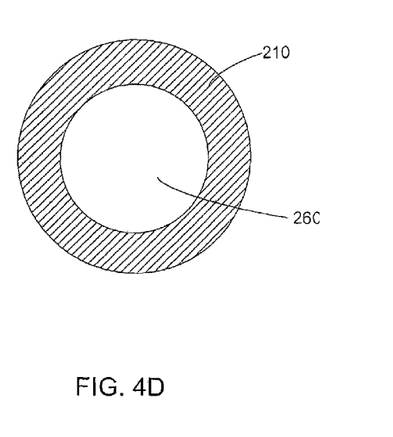

As illustrated in FIG. 4D, in various embodiments, screen 125 comprises screen substrate 260 and amorphous $IrO_2$ containing layer 210. In various embodiments, amorphous $IrO_2$ containing layer 210 comprises multiple coats of a mixture of amorphous $IrO_2$ and amorphous $Ta_2O_5$ or a mixture of amorphous and crystalline $IrO_2$ and amorphous $Ta_2O_5$.

In general, each layer, for example crystalline $IrO_2$ containing layer 220 and/or amorphous $IrO_2$ containing layer 210 each are made up of a mixture of $IrO_2$ and $Ta_2O_5$, and in accordance with various aspects of the present invention, each such layer is formed from at least one and preferably a plurality of coats. Preferably as noted herein, crystalline $IrO_2$ containing layer 220 advantageously comprises a layer crystalline in nature, and amorphous $IrO_2$ containing layer 210 comprises a layer substantially amorphous in nature. However, the use of only one layer comprising substantially amorphous $IrO_2$ on a conductive substrate is within the scope of the present invention.

Figure 5:
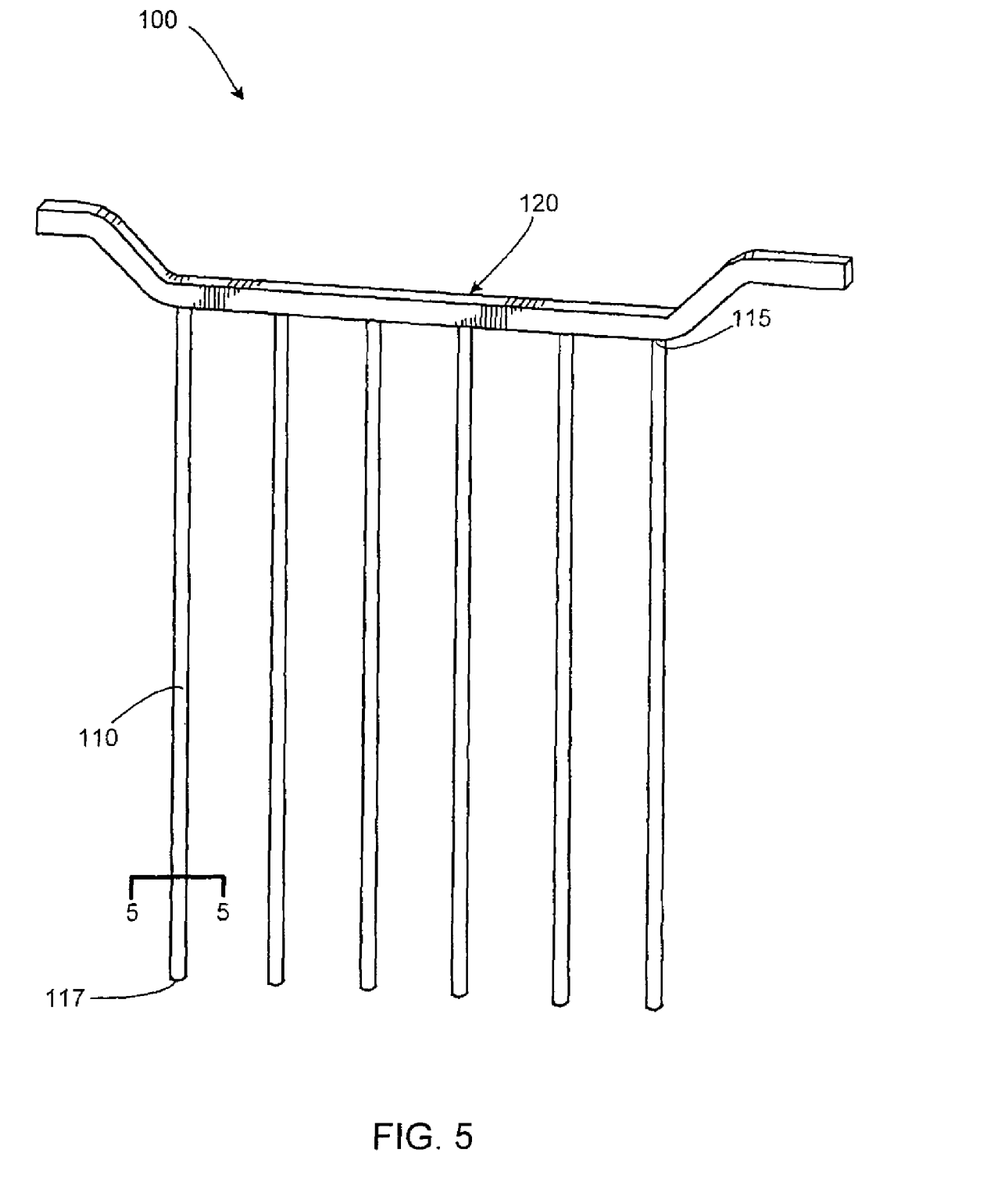
FIG. 5 is a perspective view illustrating an electrode without a screen according to various embodiments of the present invention.

With reference to FIG. 5, an electrode is illustrated according to various embodiments of the present invention. In various embodiments, the electrode is an anode 100 for use in an electrolytic cell. Anode 100 comprises an electrically conductive material. Anode 100 is coupleable or connectable to a power source of an electrolytic cell. Anode 100 comprises hanger bar 120 and plurality of conductive rods 110 connected to hanger bar 120 at joint 115.

As illustrated in FIG. 5, hanger bar 120 is substantially straight and configured to be positioned horizontally in an electrowinning cell. In various embodiments, hanger bar 120 may have other shapes and/or configurations such as, for example, but not limited to, steer horn configurations, multi-angled configurations, offset configurations, combinations thereof, and the like. In various embodiments, hanger bar 120 comprises a conductive material, for example, but not limited to, copper, copper alloy, aluminum, copper aluminum alloys, stainless steel, titanium, gold, combinations thereof, or any other electrically conductive material suitable for hanger bar 120.

Typically, rods 110 are approximately the same length, diameter, and material of construction and may be spaced approximately evenly along the length of the hanger bar 120. Rods 110 may have any suitable cross-sectional geometry, such as, for example, round, hexagonal, square, rectangular, octagonal, oval, elliptical, rhombus, corrugated, or any other desired geometry. The desired cross-sectional geometry of rods 110 may be chosen to optimize harvestability of a metal value and/or to optimize flow and/or mass transfer characteristics of the electrolyte within the electrolytic cell. Rods 110 may be oriented in any direction, for example angled such that a direction of flow is changed as electrolyte goes through the plurality of rods. For example, rods 110 may have a cross-sectional geometry of a square and a face of the square is offset from the front of anode 100 at an angle such that the flow of the electrolyte is diverted. Those skilled in the art will appreciate that any suitable cross-sectional geometry and any orientation of rods 110 may be used to optimize flow and/or increase yield or harvestability of a metal value that is being electrowon.

In various embodiments, rods 110 may be formed of a conductive material such as, for example, copper, copper alloy, aluminum, copper aluminum alloys, stainless steel, titanium, gold, combinations thereof, or any other electrically conductive material suitable for rods 110. In various embodiments, rods 110 may comprise a combination of conductive materials in which an outer surface of a first conductive material is coated or clad by a second conductive material. In an exemplary embodiment, rod 110 comprises a copper or copper alloy core and a titanium cladding clad over the core.

As illustrated in FIG. 5, rods 110 are connected at joint 115 to hanger bar 120. Joint 115 may be any known or hereafter developed fastening system that provides conductivity from hanger bar 120 to rods 110 and the strength to hold rods 110 to hanger bar 120. For example, joint 115 may consist of welding rods 110 to hanger bar 120 and such techniques are well known to those skilled in the art. In various embodiments, joint 115 may include holes drilled into hanger bar 120 so that plurality of rods 110 may be connected to hanger bar 120 by using a press fit system. In various embodiments, joint 115 may include the use of a conductive adhesive, such as, for example, but not limited to, polyacrylomide compositions. In various embodiments, joint 115 has low resistance and provides high conductivity from hanger bar 120 to rods 110. In various embodiments, joint 115 is designed to be corrosion resistant or at least substantially corrosion resistant.

With reference to FIG. 6, a cross sectional view of one of the rods 110 along the line 5-5 of FIG. 5 is illustrated. Conductive substrate 240 may be made of any metal, alloy, or material that is electrically conductive and is substantially rigid. For example, thin wires, which are substantially rigid but are still bendable and constructed using a conductive metal or alloy, may be appropriate for use as conductive substrate 240. Conductive substrate 240 may comprise any electrically conductive metal, alloy, polymer, and/or material, such as, for example, but not limited to, copper, copper alloys, aluminum, copper aluminum alloys, stainless steel, titanium, palladium, platinum, gold, valve metals or any other metal alloy, conductive polymer, or conductive material and combinations thereof. In an exemplary embodiment, a copper rod may be used for conductive substrate 240.

In various embodiments, as illustrated in FIG. 6, conductive substrate 240 may be clad with a layer of conductive cladding layer 230. The conductive cladding layer 230 may be any conductive material, metal, alloy, conductive polymer, or other electrically conductive material. Cladding may be desirable for a number of reasons, including, for example but not limited to, providing corrosion resistance, and/or increasing operational life time of anode 100.

In various embodiments, conductive cladding layer 230 may comprise a valve metal. In various embodiments of the present invention, conductive cladding layer 230 may be formed of one of the so-called "valve" metals, including titanium, tantalum, zirconium, or niobium. For example, titanium may be alloyed with nickel, cobalt, iron, manganese, or copper to form a suitable conductive cladding layer 230. In an exemplary embodiment, conductive cladding layer 230 comprises titanium, because, among other things, titanium is rugged and corrosion-resistant.

Conductive cladding layer 230 may cover essentially the entire surface of conductive substrate 240 and in various embodiments may include a cap for distal end 117 of at least one of rods 110. In various embodiments, conductive cladding layer 230 goes to distal end 117. In various embodiments, conductive cladding layer 230 covers the entirety of the surface of rods 110 up to joint 115. Conductive cladding layer 230 may be a seal to joint 115 if joint 115 includes rods 110 press fit into hanger bar 120. Typically, conductive cladding layer 230 is not included on a portion of rods 110 that is inserted into holes of hanger bar 120 for press fit applications of joint 115.

Figure 6A:
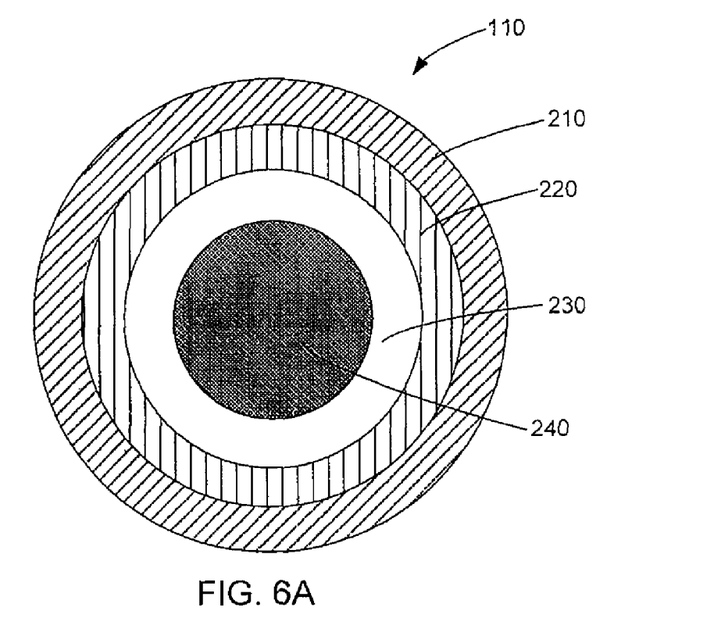
FIG. 6 is a cross sectional view of the electrode along the line 5-5 of FIG. 5 according to various embodiments of the present invention.

With reference to FIG. 6A, a cross sectional view of one of rods 110 along the line 5-5 of FIG. 5 is illustrated. In various embodiments, rods 110 may comprise conductive substrate 240, conductive cladding layer 230, crystalline $IrO_2$ containing layer 220, and amorphous $IrO_2$ containing layer 210.

Figure 6B:
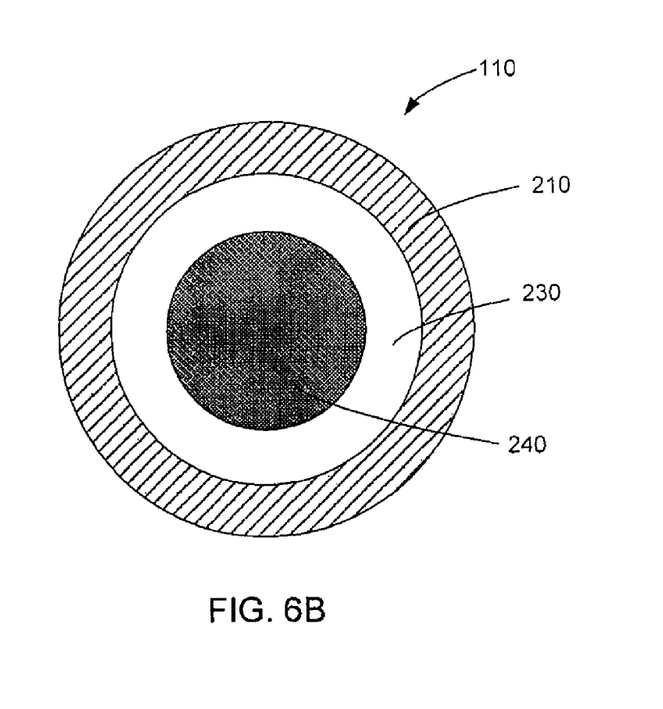

With reference to FIG. 6B, a second cross sectional view of one of the rods 110 along the line 5-5 of FIG. 5 is illustrated. In various embodiments, rods 110 may comprise conductive substrate 240, conductive cladding layer 230, and amorphous $IrO_2$ containing layer 210.

In various embodiments, crystalline $IrO_2$ containing layer 220 may be coated over essentially the entirety of a surface of rods 110. In various embodiments, as illustrated in FIG. 6A, crystalline $IrO_2$ containing layer 220 is coated over essentially an entire surface of conductive cladding layer 230 and amorphous $IrO_2$ containing layer 210 is coated over crystalline $IrO_2$ containing layer 220. In various embodiments, as illustrated in FIG. 6B, amorphous $IrO_2$ containing layer 210 is coated over essentially an entire surface of conductive cladding layer 230. As noted herein above, layers 210 and 220 may comprise a plurality of coats.

In various embodiments, as illustrated in FIGS. 6A and 6B, conductive substrate 240 may be clad with a layer of conductive cladding layer 230. The conductive cladding layer 230 may be any conductive material, metal, alloy, conductive polymer, or other electrically conductive material. Cladding may be desirable for a number of reasons, including, for example but not limited to, lowering resistance between conductive substrate 240 and at least one of crystalline $IrO_2$ containing layer 220 and amorphous $IrO_2$ containing layer 210, providing the improved surface for forming crystalline $IrO_2$ containing layer 220, improving conductive flow of anode 110, and/or increasing operational life time of anode 110.

In various embodiments, crystalline $IrO_2$ containing layer 220 may comprise a mixture of $IrO_2$ and $Ta_2O_5$. The mixture of oxides can be preferably obtained as will be described hereinbelow, as a result of a process wherein a precursor solution containing iridium and tantalum, in various proportions, is suitably applied to a conductive substrate and heated to various temperatures. In an exemplary embodiment, the precursor solution may be applied to the surface of each of rods 105, 110 and/or screen substrate 260. After application of the precursor solution to rods 105, 110 and/or screen substrate 260, the precursor solution is heated to oxidize iridium and tantalum contained in the precursor solution. Crystalline $IrO_2$ containing layer and/or amorphous $IrO_2$ containing layer may be desired to achieve advantageous results.

As will be appreciated, amorphous or crystalline $IrO_2$ may be variously obtained by suitably adjusting the heating temperature. Where crystalline properties are desired, generally, temperatures that may be used are preferably above the glass transition temperature for $IrO_2$. Preferably a temperature in the range of from about 440° C. to about 520° C., preferably from about 450° C. to about 500° C., and more preferably from about 460° C. to about 480° C. In an exemplary embodiment, heating of the precursor solution to obtain crystalline $IrO_2$ containing layer 220 is to a temperature of around 470° C. In various embodiments, crystalline $IrO_2$ containing layer 220 contains crystalline $IrO_2$.

After the process of applying the precursor solution to rods 110 and heating the precursor solution to produce the first coat comprising a mixture of crystalline $IrO_2$ and amorphous $Ta_2O_5$ on rods 110 is finished, the precursor solution may be applied over this first coat to create a second coat of the mixture of crystalline $IrO_2$ and amorphous $Ta_2O_5$ in the same way. This can create a (dimensionally) thicker crystalline $IrO_2$ containing layer 220.

In various embodiments, this process may be repeated multiple times. For example, crystalline $IrO_2$ containing layer 220 can comprise from about 1 coat to about 100 coats or about 1 coat to about 50 coats or preferably about 1 coat to about 20 coats or more preferably about 1 coat to about 10 coats. In an exemplary embodiment, crystalline $IrO_2$ containing layer 220 can comprise from about 3 coats to about 5 coats or more preferably about 4 coats. Repeating the process multiple times to thicken the crystalline $IrO_2$ containing layer 220 may create crystalline $IrO_2$ containing layer 220 that is more likely to contain crystalline $IrO_2$, and more likely to have improved integrity and lifetime of crystalline $IrO_2$ containing layer 220.

In various embodiments, amorphous $IrO_2$ containing layer 210 comprises a mixture of $IrO_2$ and $Ta_2O_5$. In an exemplary embodiment, to create amorphous $IrO_2$ containing layer 210, a precursor solution containing iridium and tantalum, in various proportions, may be applied on the surface of each of rods 105, 110 and/or screen substrate 260. After application of the precursor solution to rods 105, 110 and/or screen substrate 260, the precursor solution is heated to oxidize iridium and tantalum. Where amorphous properties are desired, generally, temperatures that may be used are preferably below the glass transition temperature for $IrO_2$. Preferably a temperature from about 360° C. to about 430° C., or from about 370° C. to about 420° C., and more preferably from about 380° C. to about 400° C. In an exemplary embodiment, heating the precursor solution is to a temperature of around 390° C. In various embodiments, amorphous $IrO_2$ containing layer 210 contains amorphous $IrO_2$ or in a combination of amorphous $IrO_2$ and crystalline $IrO_2$.

After the process of applying the precursor solution to rods 110 and heating the precursor solution to produce the first coat comprising a mixture of amorphous $IrO_2$ and amorphous $Ta_2O_5$ or amorphous and crystalline $IrO_2$ and amorphous $Ta_2O_5$ on rods 110 is finished, the precursor solution may be applied over this first coat to create a second coat of the mixture of amorphous $IrO_2$ and amorphous $Ta_2O_5$ or amorphous and crystalline $IrO_2$ and amorphous $Ta_2O_5$ in the same way. This can create a (dimensionally) thicker amorphous $IrO_2$ containing layer 210.

In various embodiments, this process may be repeated multiple times. For example, amorphous $IrO_2$ containing layer 210 can comprise from about 1 coat to about 100 coats or about 1 coat to about 50 coats or preferably about 1 coat to about 20 coats or more preferably about 1 coat to about 10 coats. In an exemplary embodiment, amorphous $IrO_2$ containing layer 210 can comprise from about 6 coats to about 8 coats or more preferably about 7 coats. Repeating the process multiple times to thicken amorphous $IrO_2$ containing layer 210 may create amorphous $IrO_2$ containing layer 210 that is at least one of more consistent, more likely to be an amorphous $IrO_2$, improved integrity and lifetime of amorphous $IrO_2$ containing layer 210 and/or the like.

Figure 7:
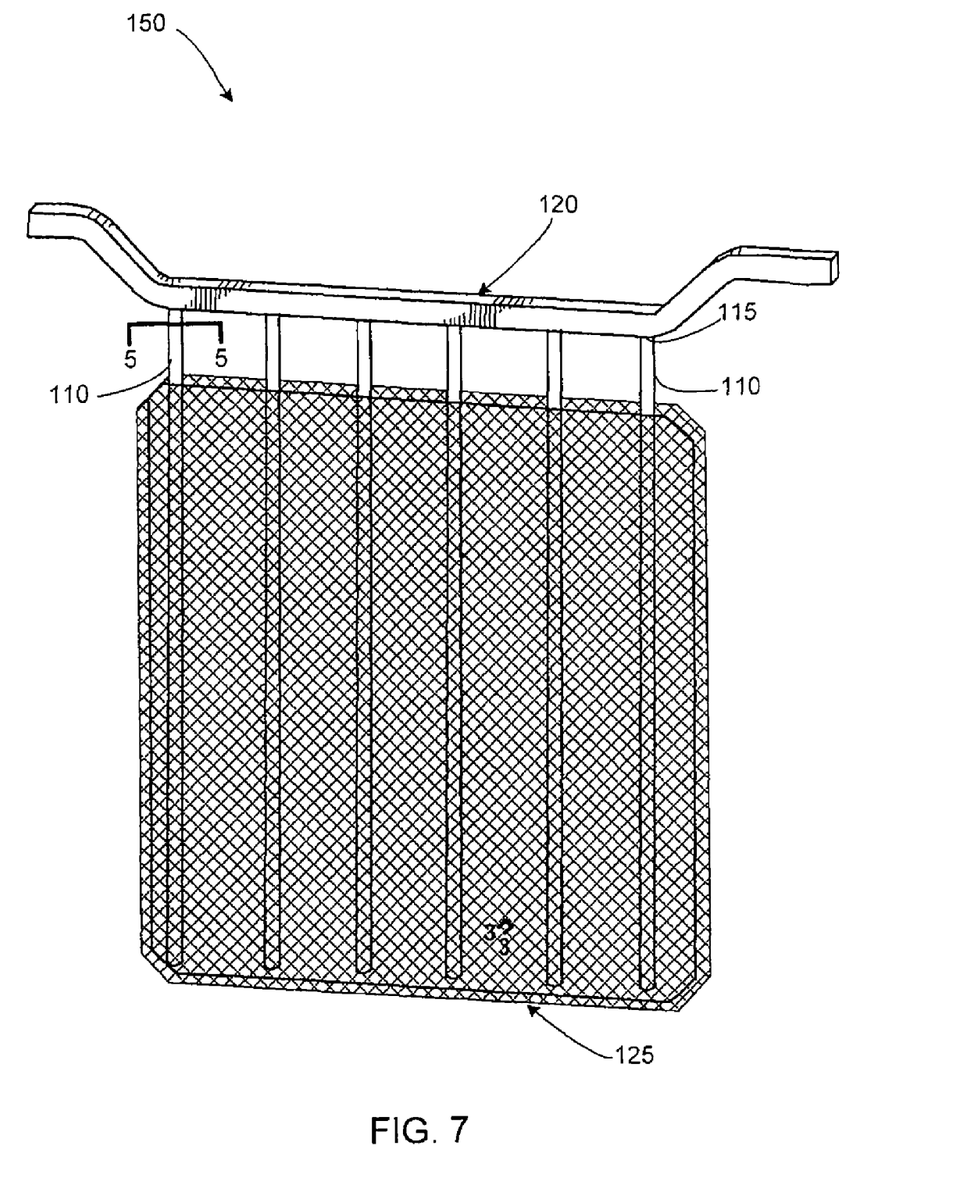
FIG. 7 is a partial perspective view illustrating a coated electrode comprising a screen according to various embodiments of the present invention.

With reference to FIG. 7, an electrode comprising a screen is illustrated in accordance with various embodiments of the present invention. As illustrated in FIG. 7, anode 150 comprises hanger bar 120, a plurality of rods 110, joint 115, and screen 125. Rods 110, as illustrated in FIG. 7, may comprise multiple layers as described by and illustrated in FIGS. 6A and 6B.

With further reference to FIG. 7, in accordance with various embodiments, screen 125 may be fastened to rods 110, and such fastening methods are well known in the art and may include, for example, welding, adhesives, braided wire, fasteners, staples, and the like. Any means now known or ever developed in the future that may hold screen 125 to rods 110 may be used as long as a portion of screen 125 is in electrical conductive contact to at least one of rods 110. Screen 125 may be constructed of any conductive material, for example, those as described herein. As illustrated in FIG. 4, screen 125 can comprise screen substrate 260. In various embodiments, screen substrate 260 comprises a valve metal or a combination of valve metals or alloys comprising at least one valve metal. In an exemplary embodiment, screen substrate 260 comprises titanium.

In various embodiments, screen 125 may also optionally comprise any electrochemically active coating. In various embodiments, screen 125 may be coated as described by and illustrated in the various cross sectional views of FIG. 4.

In accordance with various embodiments, the present invention provides methods for making an electrode that is useful in an electrolytic cell. In various embodiments, the electrode may be an anode. Methods may include preparing a precursor solution comprising iridium and tantalum having a mole ratio of iridium to tantalum in a range from about 50:50 to about 99:1 or preferably in a range from about 70:30 to about 90:10 or more preferably about 80:20.

The method may include coating of a portion of screen substrate 260 with the precursor solution and then heating the precursor solution to a temperature from about 440° C. to about 520° C., preferably from about 450° C. to about 500° C., and more preferably from about 460° C. to about 480° C. to produce crystalline $IrO_2$ containing layer 220. In various embodiments, the method may include coating of conductive substrate 240 or conductive cladding layer 230 with the precursor solution and then heating the precursor solution to a temperature from about 440° C. to about 520° C., preferably from about 450° C. to about 500° C., and more preferably from about 460° C. to about 480° C. to produce crystalline $IrO_2$ containing layer 220. In an exemplary embodiment, the heating of the precursor solution is to a temperature around 470° C. In various embodiments, the process from coating to heating of screen substrate 260 and/or conductive substrate 240 or conductive cladding layer 230 may be repeated several times as discussed herein. As those skilled in the art will appreciate, the heating of the precursor solution can thermally decompose iridium and tantalum in the precursor solution to form $IrO_2$ and $Ta_2O_5$. Iridium and tantalum in the precursor solution may be in the forms of ions, complex ions, inorganic compounds, or organic compounds except oxides. For example, such precursor solution can be prepared by dissolving $H_2IrCl_6$ and $TaCl_5$ into n-butanol containing 6 vol % HCl.

Methods may also include coating the first coat of a mixture of amorphous $IrO_2$ and amorphous $Ta_2O_5$ or a mixture of amorphous and crystalline $IrO_2$ and amorphous $Ta_2O_5$ with the precursor solution and heating the precursor solution to a temperature from about 360° C. to 430° C., preferably from about 370° C. to 420° C., and more preferably from about 380° C. to 400° C. to produce the second coat of the mixture of amorphous $IrO_2$ and amorphous $Ta_2O_5$ or the mixture of amorphous and crystalline $IrO_2$ and amorphous $Ta_2O_5$. In an exemplary embodiment, heating the precursor solution is to a temperature around 390° C. In various embodiments, the process from coating to heating may be repeated several times as discussed herein.

In various embodiments of the methods, the heating of the precursor solution is to a temperature above a glass transition temperature of $IrO_2$ to create crystalline $IrO_2$ containing layer 220 containing crystalline $IrO_2$. In various embodiments, the method includes heating the precursor solution to a temperature below the glass transition temperature of $IrO_2$ and to create amorphous $IrO_2$ containing layer 210 containing substantially amorphous $IrO_2$ or completely amorphous $IrO_2$. In various embodiments, a glass transition temperature for $IrO_2$ is from about 380° C. to about 480° C., preferably from about 400° C. to about 470° C., more preferably from about 420° C. to about 460° C., and even more preferably from about 430° C. to about 450° C. As those skilled in the art will appreciate, the glass transition temperature may be varied based on the molar ratio of iridium to tantalum in the precursor solution and the other conditions.

The term "substantially in a phase" as used herein means that at least 50% of a compound is in the phase and more preferably at least 70% of a compound is in the phase and still more preferably at least 90% of a compound is in the phase. In an exemplary embodiment, substantially in a phase means that at least 95% of a compound is in the phase and in an aspect of the exemplary embodiment, at least 99% of the compound is in the phase.

In accordance with various embodiments, the present invention provides methods may be used to make an electrode useful for electrowinning. In various embodiments, the electrode may be anode 50, 100, 150. In various embodiments, a precursor solution suitable for coating at least a portion of anode 50, 100, 150 may be prepared to have a mole ratio of iridium to tantalum in a range from about 50:50 to about 99:1 or preferably in a range from about 70:30 to about 90:10 or more preferably about 80:20. In various embodiments, amorphous $IrO_2$ containing layer 210 may be prepared by thermal decomposition of the precursor solution at low temperatures below about 430° C. Amorphous $IrO_2$ containing layer 210 may comprise amorphous $IrO_2$ and amorphous $Ta_2O_5$ combination or crystalline and amorphous $IrO_2$ and amorphous $Ta_2O_5$ combination formed on at least a portion of screen substrate 260 and/or conductive substrate 240 or conductive cladding layer 230.

In various embodiments, the present invention provides an anode 50, 100, 150, which comprises a mixture of amorphous $IrO_2$ and amorphous $Ta_2O_5$ formed on a titanium substrate which may be prepared by thermal decomposition at low temperatures of the precursor solution containing dissolved ions of iridium and tantalum.

Figure 8:
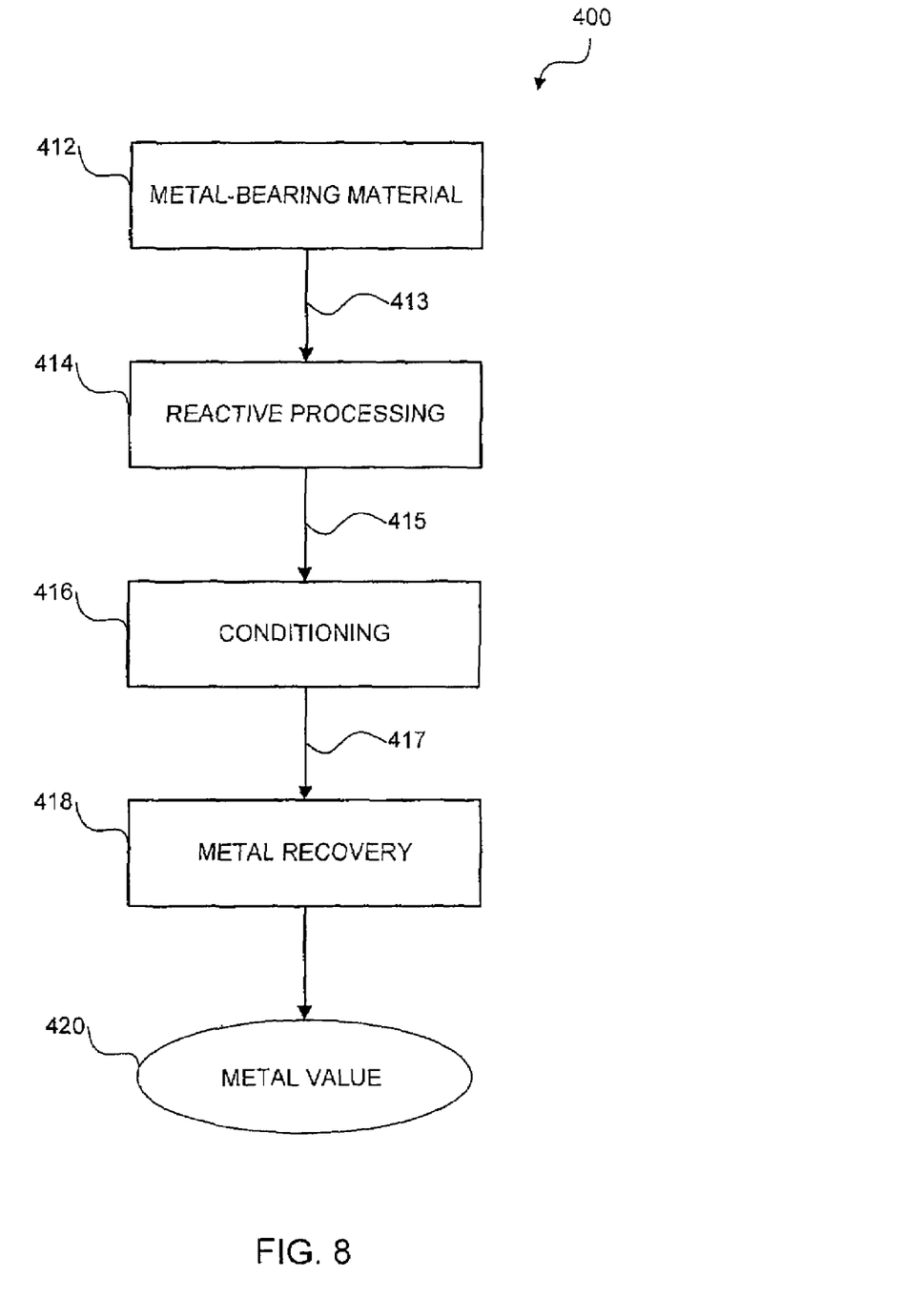
FIG. 8 is a block diagram illustrating exemplary steps in a metal value extraction process according to various embodiments of the present invention.

Referring to FIG. 8, in accordance with various aspects of the present invention, a metal-bearing material 412 is provided for processing in accordance with metal recovery process 400. Metal-bearing material 412 may be an ore, a concentrate, or any other material from which metal values may be recovered. Metal values such as, for example but not limited to, copper, gold, silver, platinum group metals, nickel, cobalt, molybdenum, rhenium, uranium, rare earth metals, and the like, may be recovered from metal-bearing material 412 in accordance with various embodiments of the present invention. Various aspects and embodiments of the present invention, however, prove especially advantageous in connection with the recovery of copper from copper sulfide concentrates and/or ores, such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$), and/or mixtures thereof. Thus, in various embodiments, metal-bearing material 412 is a copper ore or concentrate, and in an exemplary embodiment, metal-bearing material 412 is a copper sulfide ore or concentrate. In addition, various aspects and embodiments of the present invention also prove advantageous in connection with the recovery of copper from copper oxide ores and/or concentrates thereof. Thus, in various embodiments, metal-bearing material 412 is a copper ore or concentrate, and in an exemplary embodiment, metal-bearing material 412 is a copper sulfide ore or a copper oxide ore, mixture thereof, or concentrates thereof.

In various embodiments, processed metal-bearing material 415 may comprise metal-bearing material 412 prepared for metal recovery process 400 in any manner that enables the conditions of processed metal-bearing material 413 to be suitable for a chosen processing method, as such conditions may affect the overall effectiveness and efficiency of processing operations. Desired composition and component concentration parameters may be achieved through a variety of chemical and/or physical processing stages, the choice of which will depend upon the operating parameters of the chosen processing scheme, equipment cost and material specifications. For example, metal-bearing material 412 may undergo comminution, flotation, blending, and/or slurry formation, as well as chemical and/or physical conditioning to produce processed metal-bearing material 413. In an exemplary embodiment, processed metal-bearing material 413 is a concentrate.

With continued reference to FIG. 8, after metal-bearing material 412 has been suitably prepared, processed metal-bearing material 413 is subjected to reactive processing step 414 to put a metal value or metal values in processed metal-bearing material 413 in a condition for later metal recovery steps, namely metal recovery 418. For example, exemplary suitable processes include reactive processes that tend to liberate the desired metal value or metal values from the metal-bearing material 412. In accordance with an exemplary embodiment of the present invention, reactive processing step 414 may comprise leaching. Leaching can be any method, process, or system that enables a metal value to be leached from processed metal-bearing material 413. Typically, leaching utilizes acid to leach a metal value from processed metal-bearing material 413. For example, leaching can employ a leaching apparatus such as for example, a heap leach, a vat leach, a tank leach, a pad leach, a leach vessel or any other leaching technology useful for leaching a metal value from processed metal-bearing material 413.

In accordance with various embodiments, leaching may be conducted at any suitable pressure, temperature, and/or oxygen content. Leaching can employ one of a high temperature, a medium temperature, or a low temperature, combined with one of high pressure, or atmospheric pressure. Leaching may utilize conventional atmospheric or pressure leaching, for example but not limited to, low, medium or high temperature pressure leaching. As used herein, the term "pressure leaching" refers to a metal recovery process in which material is contacted with an acidic solution and oxygen under conditions of elevated temperature and pressure. Medium or high temperature pressure leaching processes for chalcopyrite are generally thought of as those processes operating at temperatures from about 120° C. to about 190° C. or up to about 250° C. In accordance with various embodiments of the present invention, reactive processing step 414 may comprise any type of reactive process to put a metal value or values in processed metal-bearing material 413 in a condition to be subjected to later metal recovery steps.

In various embodiments, reactive processing 414 provides a metal bearing slurry 415 for conditioning 416. In various embodiments, conditioning 416 can be for example, but is not limited to, a solid liquid phase separation step, an additional leach step, a pH adjustment step, a dilution step, a concentration step, a metal precipitation step, a filtering step, a settling step, and the like, as well as combinations thereof. In an exemplary embodiment, conditioning 416 can be a solid liquid phase separation step configured to yield a metal bearing solution 417 and a metal bearing solid.

In other various embodiments, conditioning 416 may be one or more leaching steps. For example, conditioning 416 may be any method, process, or system that further prepares metal bearing material 412 for recovery. In various embodiments, conditioning 416 utilizes acid to leach a metal value from a metal bearing material. For example, conditioning 416 may employ a leaching apparatus such as for example, a heap leach, a vat leach, a tank leach, a pad leach, a leach vessel or any other leaching technology useful for leaching a metal value from a metal bearing material.

In accordance with various embodiments, conditioning 416 may be a leach process conducted at any suitable pressure, temperature, and/or oxygen content. In such embodiments, conditioning 416 may employ one of a high temperature, a medium temperature, or a low temperature, combined with one of high pressure, or atmospheric pressure. Conditioning 416 may utilize conventional atmospheric or pressure leaching, for example but not limited to, low, medium or high temperature pressure leaching. Medium or high temperature pressure leaching processes for chalcopyrite are generally thought of as those processes operating at temperatures from about 120° to about 190° C. or up to about 250° C.

In various embodiments, conditioning 416 may comprise dilution, settling, filtration, solution/solvent extraction, ion exchange, pH adjustment, chemical adjustment, purification, concentration, screening, and size separation. In various embodiments, conditioning 416 is a high temperature, high pressure leach. In other embodiments, conditioning 416 is an atmospheric leach. In further embodiments, conditioning 416 is a solid liquid phase separation. In still further embodiments, conditioning 416 is a settling/filtration step. In various embodiments, conditioning produces metal-bearing solution 417.

In various embodiments, metal-bearing slurry 417 may be subjected to metal recovery 418 to yield metal value. In exemplary embodiments, metal recovery 418 can comprise electrowinning metal-bearing solution 417 to yield recovered metal value 420 as a cathode. In one exemplary embodiment, metal recovery 418 may be configured to employ conventional electrowinning processes and include a solvent extraction step, an ion exchange step, an ion selective membrane, a solution recirculation step, and/or a concentration step. In one preferred embodiment, metal recovery 418 may be configured to subject metal-bearing solution 417 to a solvent extraction step to yield a rich electrolyte solution, which may be subject to an electrowinning circuit to recover a desired metal value 420. In another exemplary embodiment, metal recovery 418 may be configured to employ direct electrowinning processes without the use of a solvent extraction step, an ion exchange step, an ion selective membrane, a solution recirculation step, and/or a concentration step. In another preferred embodiment, metal recovery 418 may be configured to feed metal-bearing solution 417 directly into an electrowinning circuit to recover a desired metal value 420. In an especially preferred embodiment, metal value 420 is copper.

For the sake of convenience and a broad understanding of the present invention, an electrowinning circuit useful in connection with various embodiments of the present invention may comprise an electrowinning circuit, constructed and configured to operate in a conventional manner. The electrowinning circuit may include a plurality of electrowinning cells; each cell may be constructed as an elongated rectangular tank or vessel containing alternating cathodes and anodes, arranged perpendicular to the long axis of the tank. A metal-bearing solution may be provided to the tank, for example at one end, to flow perpendicular to the plane of the parallel anodes and cathodes. With the application of current from a power source, a metal value, such as for example, copper, can be deposited at the cathodes, and water can be electrolyzed to form oxygen and protons at the anodes.

Figure 9:
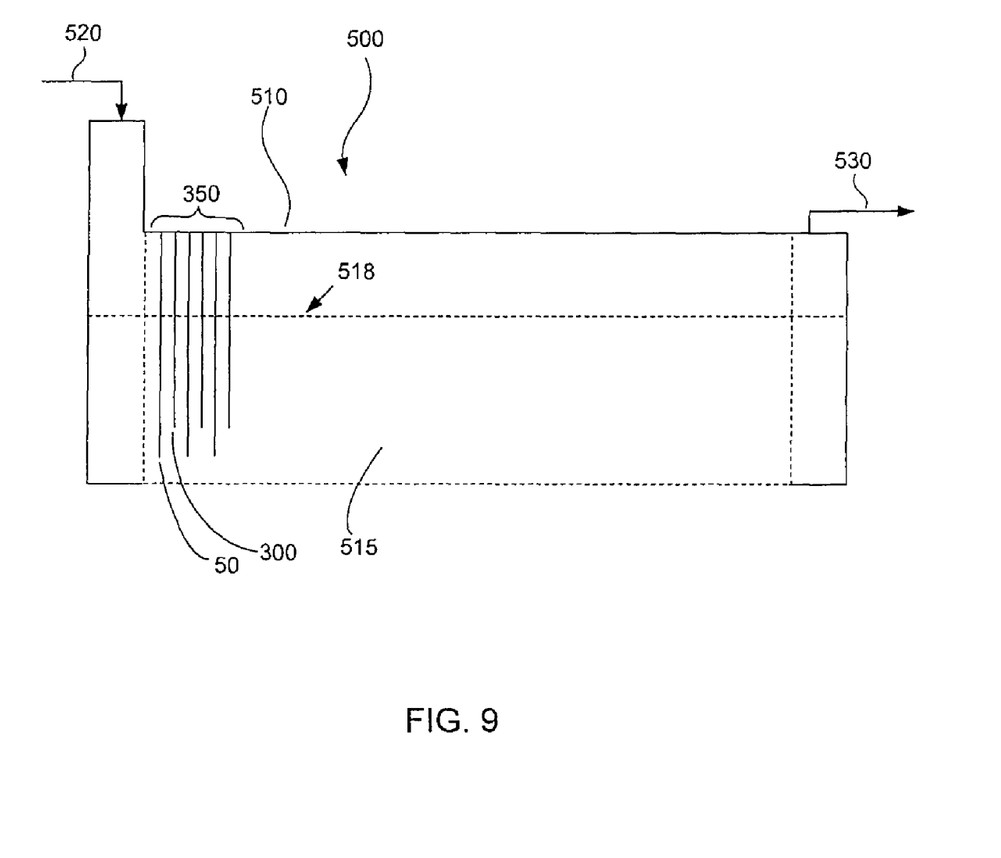
FIG. 9 is a cross sectional view illustrating an electrolytic cell according to various embodiments of the present invention.

In various embodiments, the present invention provides improvements to an electrolytic cell or to an electrolytic cell system that are useful in electrowinning of a metal value, for example copper. With reference to FIG. 9, electrolytic cell 500, which may be an electrowinning cell, comprises a vessel 510 used for electrolysis containing electrolyte 515, at least one cathode 300, and at least one anode 50. As appreciated by those skilled in the art, anode 50 could be replaced or interchanged with anode 100 or anode 150 as described herein but for the sake of brevity, the following will discuss anode 50. Electrolyte 515 is typically a solution of water or other solvents capable of dissolving metal values into the solution and is inert unless driven by power source (not shown) into a redox reaction with anode 50 and cathode 300. Electrolytic cell 500 includes electrolyte in 520 and electrolyte out 530. Electrolyte 515 flows through vessel 510 beginning at electrolyte in 520 and exiting at electrolyte out 530. Electrolyte 515 fills vessel 510 to a height 518. Electrodes 350, which include multiple anodes 50 and cathodes 300, are active when submerged in electrolyte 515 to the point of height 518. As those skilled in the art will appreciate, height 518 is most efficient when essentially all of the area of the plurality of electrodes 350 is submerged in electrolyte 515. Plurality of electrodes 350 may be any number of alternating anodes 50 and cathodes 300, generally placed in an alternating pattern. An exemplary embodiment of an electrolytic cell 500 comprises between about 4 and about 80 anodes 50 and between about 4 and about 80 cathodes 300. It should be appreciated in accordance with the present invention that any number of anodes 50 and/or cathodes 300 may be utilized. It also should be appreciated by those skilled in the art that electrolytic cell 500 may comprise electrolyte flow systems, drainage systems, filling systems and the like, including any necessary plumbing, pumps, jets, vacuums, agitators and the like for such systems. Generally speaking, any electrolyte solution pumping, circulation, or agitation system capable of maintaining satisfactory flow and circulation of electrolyte 515 between plurality of electrodes 350 and electrolytic cell 500 may be used in accordance with various embodiments of the present invention.

In various embodiments of the present invention as concentration, any electrolyte 515 for electrowinning may be maintained at a level from about 1 to about 500 grams of acid per liter of electrolyte 515. In various embodiments, the acid concentration of electrolyte 515 may be maintained at a level of about 5 to about 250 or from about 150 to about 205 grams of acid per liter of electrolyte 515, depending upon upstream metal value preparation processes. As known to those skilled in the art, electrolyte 515 may comprise a metal value that may be electrowon by use of electrolytic cell 500. In an exemplary embodiment, the metal value is copper.

In various embodiments of the present invention, the temperature of electrolyte 515 in electrolytic cell 500 is maintained above freezing point of electrolyte 515 and below the boiling point of electrolyte 515. In accordance with various embodiments, electrolyte 515 is maintained at a temperature from about 5° C. to about 66° C. or from about 32° C. to about 60° C. Higher temperatures may, however, be advantageously employed. For example, in direct electrowinning operations, temperatures higher than 60° C. may be utilized. Alternatively, in certain applications, lower temperatures may be advantageously employed. For example, in direct electrowinning of the copper-containing solutions, temperatures below 32° C. may be utilized.

The operating temperature of the electrolyte 515 in electrolytic cell 500 may be controlled through any one or more of a variety of means well-known to those skilled in the art, including, for example but not limited to, heat exchangers, immersion heating elements, inline heating devices, or the like. Any heating device that is employed may be coupled to one or more feedback temperature control means for efficient process control.

For purposes of this description of various embodiments of the present invention, the term "cathode" refers to a complete electrode assembly to which negative polarity is applied and is typically connected to a power source (not shown). As used herein, the term "flow-through cathode" refers to any cathode 300 configured to enable electrolyte 515 solution to pass through it in the electrolytic cell 500 to flow through the cathode 300 during an electrowinning process.

In various embodiments of conventional electrowinning operations, such as for example those used in copper purification, use either a copper starter sheet, stainless steel "blank", or titanium "blank" as the cathode 300 in the electrolytic cell. In an exemplary embodiment, the cathode 300 in electrolytic cell 500 may be configured as a flow-through cathode 300 to allow flow of electrolyte 515 solution through the cathode 300.

Various flow-through cathode 300 configurations may be suitable, including: multiple parallel metal wires, thin rods, including hexagonal rods or other geometries, multiple parallel metal strips either aligned with electrolyte flow or inclined at an angle to flow direction, metal mesh, expanded porous metal structure, metal wool or fabric, and/or conductive polymers. The cathode 300 may be formed of copper, copper alloy, stainless steel, titanium, aluminum, or any other metal or combination of metals and/or other materials. Polishing or other surface finishes, surface coatings, surface oxidation layer, or any other suitable barrier layer may advantageously be employed to enhance harvestability of a metal value, such as for example copper. Alternatively, unpolished or rough surfaces may also be utilized. In accordance with various embodiments of the present invention, the cathode 300 may be configured in any manner now known or ever developed in the future.

Furthermore, the term "anode" refers to a complete electrode assembly to which positive polarity is applied and is typically connected to a power source (not shown). As used herein, the term "flow-through anode" refers to any anode (such as anode 50, 100, 150 described herein) configured to enable electrolyte 515 solution to pass through it in the electrolytic cell 500 to flow through the anode 100 during an electrowinning process.

Commercially, an electrolytic cell 500 may be used for electrowinning of several metal values. In a case of electrowinning, a current is passed through anode 50, 100 or 150 through the electrolyte 515 solution containing the metal value so that the metal value is extracted as it is deposited in an electroplating process onto cathode 300. In general, electrowinning metal values may include, but are not limited to, copper, gold, silver, nickel, chromium, cobalt, manganese, rare earth metals, and alkaline metals The present invention exhibits significant advancements over prior art apparatus, and enables significant improvements in copper product quality and process efficiency. Conventional copper electrowinning occurs by the following reactions:

Cathode Reaction:

Anode Reaction:

Overall Cell Reaction:

So-called conventional copper electrowinning chemistry and electrowinning apparatus are known in the art. Conventional electrowinning operations typically operate at current densities in the range of about 220 to about 400 Amps per square meter of active cathode (20-35 A/ft²), and most typically between about 300 and about 350 A/m² (28-32 A/ft²). Using additional electrolyte circulation and/or air injection into the cell allows higher current densities to be achieved (e.g., 400-500 A/m²).

In various embodiments of the present invention, anode 50 may reduce the anode potential while in use in electrolytic cell 500. In various embodiments, the use of anode 50 may decrease cell voltage of electrolytic cell 500 and lower electrical energy consumption during the operation of electrolytic cell 500. In general, the anodes of the present invention may reduce cell voltage by about 15% as compared to the cell voltage of conventional electrowinning cells.

In accordance with various embodiments of the present invention, the amorphous nature of $IrO_2$ in the anode coating may suppress manganese oxidation and adhesion to an anode 50 in an electrolytic cell 500. Manganese oxidation may be suppressed on the electrode with a coating comprising amorphous $IrO_2$ in combination with amorphous $Ta_2O_5$. Without being bound by theory, it is believed that the suppression may also cause a decrease in the cell voltage and an increase in oxygen evolution efficiency. The unwanted manganese oxide or oxy-hydroxide deposition may be controlled and suppressed by the amorphization of $IrO_2$ in the coating with simply changing the thermal decomposition temperature to be lower.

Control of the manganese oxide deposition on $IrO_2$—$Ta_2O_5$ electrodes may be accomplished by changing the crystallographic structure of a coating when the $IrO_2$ structure in the coating is changed from a crystalline phase to an amorphous phase by reducing thermal decomposition temperature. This may be accomplished by heating the coating to a temperature below a glass transition temperature of $IrO_2$. For example, the polarization behaviors for oxygen evolution of an electrode may be enhanced in the amorphous phase.

There are some cases where the oxygen evolution potential increases without the consumption of the oxide coating, but with the deposition of metal oxide or oxy-hydroxide on the coating. This may be caused by an unwanted side reaction of metal ions existing in the electrolyte solution, which are a minor component or impurity in the solution.

The oxidation of Mn(II) ions dissolved in electrolytic cell 500 may cause MnOOH deposition on the surface of prior art anodes. In various embodiments, the MnOOH adherence to the amorphous phase of the coating on anode 50, 100, 150 is reduced. Suppressing such unwanted side reactions, the $IrO_2$—$Ta_2O_5$ electrode, such as anode 50, 100, 150, may keep low oxygen evolution potential during a long term operation.

EXAMPLE I

A precursor solution was prepared by dissolving $H_2IrCl_6.6H_2O$ and $TaCl_5$ into n-butanol containing 6 vol % HCl. The mole ratio of Ir:Ta was 80:20, and the total metal concentration was 110 g/L. A titanium mesh (1 inch×3 inch) was degreased with acetone, etched in 10 wt % oxalic acid solution at 90° C. for 60 min, washed with distilled water, and dried at room temperature. The precursor solution was applied on the area of 1 inch×1 inch of one side of the titanium mesh and was heated at 470° C., 420° C., 400° C., 380° C., or 360° C. for 30 min. Applying the precursor solution and heating were repeated 11 times. The titanium mesh electrode coated with the mixture of crystalline $IrO_2$ and amorphous $Ta_2O_5$ was obtained by heating at 470° C. The titanium mesh electrodes coated with the mixture of crystalline and amorphous $IrO_2$ and amorphous $Ta_2O_5$ were obtained by heating at 420° C. or 400° C. The titanium mesh electrodes coated with the mixture of amorphous $IrO_2$ and amorphous $Ta_2O_5$ were obtained by heating at 380° C. or 360° C.

A test solution was made containing concentrated $H_2SO_4$ diluted with distilled water, $MnSO_4*5H_2O$ and $CuSO_4*5H_2O$ also dissolved into the solution. Then the total volume of the test solution was adjusted to 200 mL with distilled water and contains 0.10 mol/L $MnSO_4$ and 35 g/L Cu.

The electrode was used as an anode, and a platinum plate was used as a cathode. These two electrodes were immersed into the test solution, and the electrolysis was carried out at 10 mA/cm$^2$ (based on anode open area) at 40° C. for 1200 seconds. The anode was weighed before and after the electrolysis, and the difference in the weight of the anode was calculated as the amount of Mn oxide (MnOOH) deposited on the anode. At least three electrodes were tested as anodes for each thermal decomposition temperature. The average values of the amount of the Mn oxide were calculated.

The amounts of deposited Mn oxide are listed in Table 1. The amount of deposited Mn oxide decreases with decreasing thermal decomposition temperature, indicating that the electrodes prepared at a temperature below 420° C., which comprise amorphous $IrO_2$, suppress Mn oxide deposition as compared to the electrode prepared at 470° C., which contains crystalline $IrO_2$ and amorphous $Ta_2O_5$.

TABLE 1

Thermal decomposition temperature and the amount of deposited Mn oxide.

| Thermal Decomposition Temperature | Amount of Deposited Mn oxide g/cm$^2$ |
|---|---|
| 380° C. | 0.0021 |
| 400° C. | 0.0022 |
| 420° C. | 0.0031 |
| 470° C. | 0.0054 |

EXAMPLE 2

A precursor solution was made by mixing two parts: iridium salt dissolved in methyle ethyle ketone and tatanlum salt dissolved in n-butanol. Mineral spirits were added to dilute the mixture. The coating mixture had an Ir:Ta molar ratio of 80:20 and a total metals concentration of 103 g/L.

Three identical expanded titanium substrate screens were prepared by etching the screens in oxalic acid. After remaining in the etch solution for at least 1 hour the titanium screens were removed, rinsed with water, and dried at room temperature.

The first layer of the precursor solution was applied to a titanium substrate using a roller method then heated at 470° C. for 20 minutes. This step was repeated 3 more times for a total of 4 coats. The first layer of the precursor solution was applied to a second titanium substrate using a roller method then heated at 380° C. for 20 minutes. This step was repeated 3 more times for a total of 4 coats. The first layer of the precursor solution was applied to a third titanium substrate using a roller method then heated at 360° C. for 20 minutes. This step was repeated 3 more times for a total of 4 coats. The three coated titanium screens were then operated in a conventional bench top copper electrowinning cell.

TABLE 2

Cell voltage obtained using anodes prepared at various thermal decomposition temperatures

| Thermal Decomposition Temperature | Cell Voltage in Cu Containing Electrolyte |
|---|---|
| 360° C. | 1.546 |
| 380° C. | 1.552 |
| 470° C. | 1.728 |

It is believed that the disclosure set forth above encompasses at least one distinct invention with independent utility.

While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein.

Various embodiments and the examples described herein are exemplary and not intended to be limiting in describing the full scope of compositions and methods of this invention. Equivalent changes, modifications and variations of various embodiments, materials, compositions and methods may be made within the scope of the present invention, with substantially similar results.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method of making an electrode for an electrolytic cell, said method comprising:
   combining an iridium solution and a tantalum solution to produce a precursor solution;
   coating a surface of a conductive substrate with said precursor solution;
   heating said precursor solution above glass transition temperature of iridium oxide to produce a crystalline iridium oxide containing layer;
   coating said crystalline iridium oxide containing layer with said precursor solution;
   heating said precursor solution below said glass transition temperature of said iridium oxide to produce an amorphous iridium oxide containing layer; and
   attaching said conductive substrate to a plurality of conductive rods.

2. The method according to claim 1, further comprising connecting said plurality of rods to a hanger bar.

3. The method according to claim 1, further comprising repeating said coating and said heating said precursor solution a plurality of times to produce said crystalline iridium oxide containing layer.

4. The method according to claim 1, further comprising repeating said coating and said heating said precursor solution a plurality of times to produce said amorphous iridium oxide containing layer.

5. The method according to claim 1 wherein said amorphous iridium oxide containing layer is substantially in an amorphous phase.

6. The method according to claim 1 wherein below said glass transition temperature is a temperature from about 360° C. to about 430° C.

* * * * *